Patented Oct. 16, 1934

1,976,940

UNITED STATES PATENT OFFICE 1,976,940

ESTER OF 2-CARBOXY-5-AMINO-DIPHENYL

William S. Jones and William Braker, Brooklyn, N. Y., assignors to E. R. Squibb & Sons, Brooklyn, N. Y., a corporation of New York No Drawing. Application September 12, 1932, Serial No. 632,789

18 Claims. (Cl. 167—52)

This invention relates to esters of 2-carboxy-5-amino-diphenyl, such as the dialkyl-aminoalkyl esters of 2-carboxy-5-amino-diphenyl and salts of these esters; more particularly it relates to 2-β-diethyl-amino-carbethoxy-5-amino diphenyl, 2-γ-di-n-butyl-amino-carbopropoxy-5-amino diphenyl and their salts. It includes both the new compounds and therapeutically active mixtures containing these compounds.

The new compounds of this invention may be prepared from 2-carboxy-5-amino-diphenyl which is claimed as a new product in our copending application Serial No. 589,039, filed January 26, 1932. By dissolving this compound and sodium in absolute alcohol and causing the salt thus formed to react with a dialkyl-amino substituted alkyl halide dissolved in absolute alcohol, the dialkyl-amino-carbalkoxy-amino-diphenyls of this invention can readily be prepared. The intermediate is advantageously prepared by diazotizing 2-amino-5-nitro-diphenyl in concentrated acid solution, then forming the nitrile by treating the diazonium salt with a cyanide, hydrolizing the nitrile and then reducing the nitro group.

The dialkyl-amino substituted side chain may be a straight chain or a branched chain. The following equation indicates various intermediates formed at various steps in the preparation of these compounds and gives a general formula for the end product where R is an alkylene radical and $R_1$ and $R_2$ are the same or different alkyl radicals.

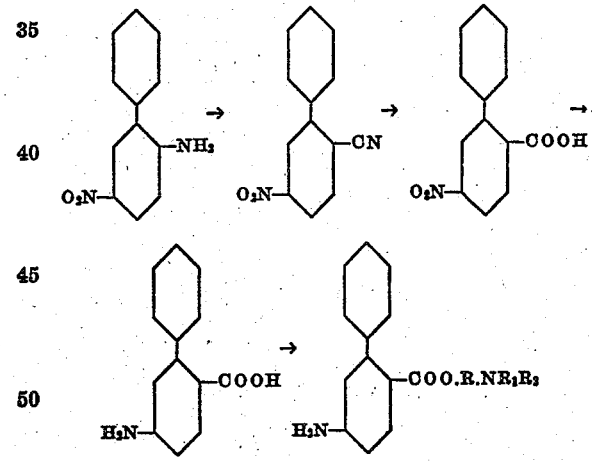

The invention will be further described by examples of the preparation of certain compounds of the invention, but it is to be understood that the invention is not limited thereto. The 2-amino-5-nitro-diphenyl which is used as the starting material may be prepared by the method given in the Journal of the Chemical Society, vol. 2, 1928, page 2774, or preferably by hydrolysis of 5-nitro-2-para-toluene sulfone amido diphenyl.

50.0 grams of 2-amino-5-nitro-diphenyl is suspended in 130 cc. of concentrated hydrochloric acid. This suspension is diazotized with 21.5 grams of sodium nitrite contained in 70 cc. of water. The diazonium solution is then added at —10° to 0° C. to a solution of potassium copper cyanide. The latter is prepared by adding 120 grams of potassium cyanide in 250 cc. of water to 100 grams of crystalline copper sulfate in 250 cc. of water. The addition of diazonium solution is made over a period of 30 minutes while stirring. The suspension thus obtained is stirred at 0° for one hour when the temperature is gradually raised to 20° C. and held at this temperature for one-half hour. The suspension is then slowly heated to 90° C. After heating for 3 hours at 90° C., the reaction mixture is carefully alkalinized with 150 cc. of 40% sodium hydroxide solution.

The precipitate formed as a result of the reaction is filtered off, washed with water and dried in vacuo. The crude nitrile is crystallized twice from alcohol. The melting point of the 2-cyano-5-nitro-diphenyl was found to be 131°–133° C.

5.2 grams of the nitrile is suspended in a solution consisting of 75 cc. of glacial acetic acid, 60 cc. of sulfuric acid and 50 cc. of water. The mixture is refluxed for about eight hours. The resulting solution is diluted with an equal volume of water. The hydrolysis of the nitrile produces a crystalline substance which is filtered off. This compound is washed with water and dried in vacuo. It is the 2-carboxy-5-nitro-diphenyl.

3.0 grams of the 2-carboxy-5-nitro-diphenyl are reduced with 10.0 grams of tin and 50 cc. of hydrochloric acid. The reduction is carried on for three hours and the tin is then precipitated out as the sulfide. The sulfide is filtered off and the filtrate evaporated to small volume.

4.5 grams of the crude hydrochloride is dissolved in 20 cc. of concentrated hydrochloric acid and 30 cc. of alcohol at 80° C. This solution is shaken with 5.0 grams of decolorizing charcoal for one-half hour at 80° C. The charcoal is removed by filtration and the filtrate is heated on the steam bath to evaporate off the alcohol. The concentrated acid solution yields practically white crystals of 2-carboxy-5-amino-diphenyl hydrochloride which are collected by filtration, sucked as dry as possible and dried in vacuo.

1.2 grams of the hydrochloride of 2-carboxy-5-amino-diphenyl are dissolved in 20 cc. of absolute alcohol. 0.22 grams of sodium dissolved in 20 cc. of absolute alcohol are added to the above solution. Sodium chloride formed by neutralization of the hydrochloride with the sodium ethoxide is filtered from the alcoholic solution. 1.0 grams of diethyl-amino-ethyl-chloride are dissolved in 10 cc. of absolute alcohol and added to the solution of the sodium salt of 2-carboxy-5-amino-diphenyl. An immediate precipitation of sodium chloride appears. The solution is refluxed for seven hours; the sodium chloride is removed by filtration and the solvent and excess β-diethyl-amino-ethyl-chloride are removed from the filtrate by distillation in vacuo. The light yellow oil remaining after the complete removal of the solvent and excess diethyl-amino-ethyl-chloride is the 2-β-diethyl-amino-carbethoxy-5-amino-diphenyl.

The dihydrochloride of the 2-β-diethyl-amino-carbethoxy-5-amino-diphenyl is prepared by passing dry hydrochloric acid gas into an ethereal solution of the free base. This separates as a yellow oil from which the ether layer is decanted. The yellow oil is then heated in an oven at 100° C. It is then placed in a dessicator containing NaOH sticks and calcium chloride. The dihydrochloride thus obtained is a yellowish white substance which is extremely hygroscopic.

1.1 grams of the hydrochloride of 2-carboxy-5-amino-diphenyl prepared as above described, or by any suitable process, is dissolved in 20 cc. of absolute alcohol. 0.2 grams of sodium in 20 cc. of alcohol is added. The sodium chloride formed is filtered off. The filtrate is added to a solution consisting of 0.92 grams of di-n-butyl-amino-propyl chloride in 30 cc. of alcohol. A precipitate of sodium chloride becomes evident after refluxing for 10 minutes. The solution is refluxed for 7 hours. The salt formed as a result of the reaction is filtered off and the filtrate is distilled on the steam bath to remove the solvent. The residue is a dark, brown oil which is the 2-γ-di-n-butyl-amino carbopropoxy-5-amino-diphenyl.

The dihydrochloride of 2-di-n-butyl-amino-carbopropoxy-5-amino-diphenyl is prepared by adding a slight excess of hydrochloric acid to an alcoholic solution of the base and evaporating to dryness in vacuo. A glassy, dark brown substance which is very brittle is obtained.

As an alternative method the new compounds of this invention may be formed by treating 4-amino-6-phenyl-benzoyl-chloride with a dialkyl-amino-alkylol, such as diethyl-amino-ethyl alcohol, etc.

Compounds of his invention have been found to have anesthetic properties. Local anesthetics are ordinarily administered in aqueous solution although it is conceivable that an oil dissolved in a suitable organic solvent such as ethylene glycol may be administered in this form to produce anesthesia. 2-β-diethyl-amino-carbethoxy-5-amino-diphenyl or one of the other esters of this invention when used as an anesthetic will therefore ordinarily be converted to a salt such as may be formed by solution in a suitable quantity of an inorganic or organic acid, and be administered in aqueous solution. When the dihydrochloride or other highly acid salt is used as an anesthetic the optimum results are obtained by buffering the solution with a phosphate or other alkaline salt.

Other salts such as the borate, etc., yield solutions of satisfactory hydrogen ion concentration so that buffering is not needed.

Other dialkyl-amino-alkyl esters of 2-carboxy-5-amino-diphenyl may be prepared in a similar manner by coupling the sodium salt of 2-carboxy-5-amino-diphenyl with other dialkyl-amino-alkyl-halides. β-dimethyl-amino-ethyl chloride will give the 2-β-dimethyl-amino-carbethoxy-5-amino-diphenyl. β-ethyl-methyl-amino-ethyl-chloride will give the 2-β-ethyl-methyl-amino-carbethoxy-5-amino-diphenyl. Instead of a dialkyl-amino-ethyl-chloride the dialkyl-amino derivatives of other alkyl chlorides may be employed, such as the dialkyl-amino derivatives of the propyl, butyl, etc. chlorides. Derivatives of both normal, secondary and tertiary chlorides may be employed. For example, β-chlor-alpha-diethyl-amino-propane, $CH_3.CHCl.CH_2.N(C_2H_5)_2$, when coupled with the sodium salt of 2-carboxy-5-amino-diphenyl will give:

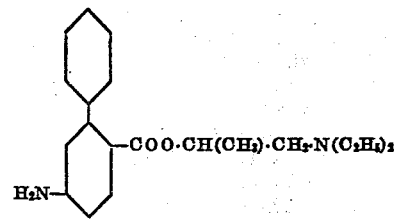

We claim:

1. Esters of 2-carboxy-5-amino-diphenyl.
2. A compound from the group consisting of the amino-alkyl esters of 2-carboxy-5-amino-diphenyl and inorganic salts thereof.
3. A compound from the group consisting of the dialkyl-amino-alkyl esters of 2-carboxy-5-amino-diphenyl and inorganic salts thereof.
4. Compounds having the general formula:

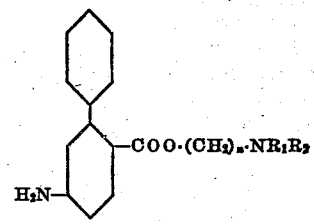

where $R_1$ and $R_2$ are the same or different alkyl groups and $n$ is any number.

5. Compounds having the general formula:

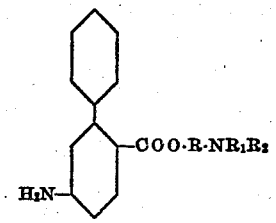

where R is an alkylene group and $R_1$ and $R_2$ are the same or different alkyl radicals.

6. A compound from the group consisting of 2-β-diethyl-amino-carbethoxy-5-amino-diphenyl and inorganic salts thereof.
7. A compound from the group consisting of 2-γ-di-n-butyl-amino-carbopropoxy-5-amino-diphenyl and inorganic salts thereof.
8. 2-β-diethyl-amino-carbethoxy-5-amino-diphenyl.
9. The dihydrochloride of 2-γ-di-n-butyl-amino-carbopropoxy-5-amino-diphenyl.
10. An anesthetic composed in part of a dialkyl-amino-alkyl ester of 2-carboxy-5-amino-diphenyl.

11. An anesthetic composed in part of an inorganic salt of a dialkyl-amino-alkyl ester of 2-carboxy-5-amino-diphenyl.

12. An anesthetic composed in part of 2-β-diethyl-amino-carbethoxy-5-amino-diphenyl.

13. An anesthetic composed in part of an inorganic salt of 2-β-diethyl-amino-carbethoxy-5-amino-diphenyl.

14. An anesthetic which comprises an alkaline buffer and a compound from the group consisting of the dialkyl-amino-alkyl esters of 2-carboxy-5-amino-diphenyl and inorganic salts thereof.

15. An anesthetic composed of the dihydrochloride of 2-β-diethyl-amino-carbethoxy-5-amino-diphenyl and a phosphate in aqueous solution.

16. The borate of a dialkyl-amino-alkyl ester of 2-carboxy-5-amino-diphenyl.

17. Inorganic salts of the dialkyl-amino-alkyl esters of 2-carboxy-5-amino-diphenyl.

18. The hydrochlorides of the dialkyl-amino-alkyl esters of 2-carboxy-5-amino-diphenyl.

WILLIAM S. JONES.
WILLIAM BRAKER.